United States Patent

[11] 3,599,075

[72] Inventors Peter Etter
Baden;
Werner Faust, Wettingen, both of,
Switzerland

[21] Appl. No. 873,808
[22] Filed Nov. 4, 1969
[45] Patented Aug. 10, 1971
[73] Assignee Aktiengesellschaft Brown, Boveri & Cie
Baden, Switzerland
[32] Priority Nov. 8, 1968
[33] Switzerland
[31] 16696/68

[54] PROTECTIONS CIRCUIT FOR SERIES CONNECTED SOLID STATE VALVES
1 Claim, 4 Drawing Figs.

[52] U.S. Cl. ........ 321/11, 307/252 L
[51] Int. Cl. ........ H02m 1/18, H02n 7/14
[50] Field of Search ........ 321/11, 27; 307/252.53, 252.54, 252.55

[56] References Cited

UNITED STATES PATENTS 3,412,312 11/1968 Rice ........ 321/11
3,424,948 1/1969 Ravas ........ 321/11 X

FOREIGN PATENTS 1,028,107 5/1966 Great Britain ........ 321/11
1,298,103 5/1962 France ........ 321/11
469,396 4/1969 Switzerland ........ 321/11

OTHER REFERENCES

The Brown Boverie Review, Vol. 55, No. 7, p. 345, July 1968, Copy in class 321-11

*Primary Examiner*—William H. Beha, Jr.
*Attorney*—Pierce, Scheffler and Parker

ABSTRACT: In a current-inverter arrangement of the type wherein a plurality of current-inverter valves, particularly thyristors, are connected in series, a pair of diodes of opposite polarity and a low-ohmic impedance unit are connected in series across each of at least some of the thyristors. The impedance unit is connected to the firing control electrode of the associated thyristor and the voltage drop produced across it in the event that a particular thyristor is not fired by a firing impulse regularly applied to its control electrode from a control transformer, provides an additional firing impulse for the thyristor.

1

INVENTORS.
Peter Etter
Werner Faust
BY
Pierce, Scheffler & Parker
Attorneys

PROTECTIONS CIRCUIT FOR SERIES CONNECTED SOLID STATE VALVES

This invention relates to an improvement in a current-inverter arrangement utilizing a plurality of series-connected current-inverter valves of the controllable solid state type, more particularly thyristors.

In order to distribute the total voltage across such a series circuit as uniformly as possible to the individual thyristors, it is known to connect one pair of series-connected diodes of opposite polarity in parallel with each thyristor. So-called avalanche breakdown voltage must be lower than the firing voltage of the thyristors.

Now it may happen in such a circuit that one or more of the thyristors are not fired for some reason or other, for example, due to a defect in firing-pulse transmission. The total voltage is then distributed across the pairs of avalanche diodes in parallel with the unfired thyristors, which can lead to permanent avalanche breakdown and thus to destruction of these pairs of diodes.

The principal object of this invention is to provide a current-inverter arrangement with series-connected current-inverter valves of the controllable solid state type, more particularly thyristors, comprising means for feeding additional firing pulses to any one or more thyristors which may not have fired.

The current-inverter arrangement according to the invention is characterized in that at least one pair of diodes connected in opposite polarity and at least one low-ohmic impedance unit connected in series therewith are connected across at least some of the current-inverter valves, each of these impedance units being provided with circuit means for transmitting any voltage changes which may drop across it, to the control electrode of the associated current-inverter valve.

The invention will be explained in detail hereinafter with reference to the following description of various embodiments thereof and the accompanying drawings wherein.

Figure 1:
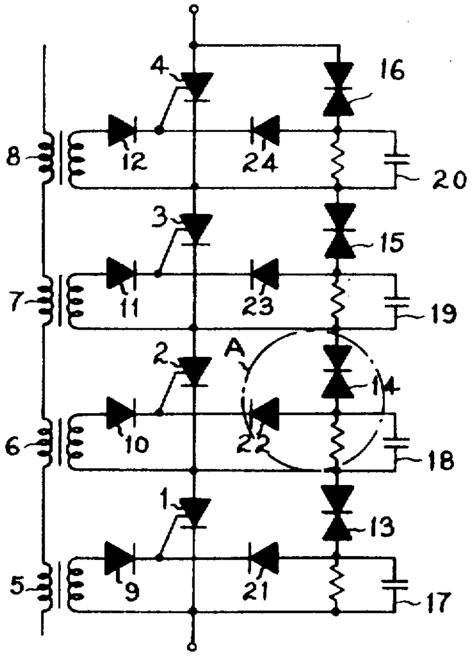
FIG. 1 is a circuit diagram of one embodiment wherein each impedance unit is in the form of a low-ohmic resistance paralleled by a condenser.

In the embodiment of the circuit according to FIG. 1, a chain of thyristors 1 to 4 are connected in series. In order to fire the thyristors, there are control transformers 5—8, the primaries of which are connected in series and the secondaries being respectively connected through coupling diodes 9 to 12 to the cathode-control-electrode path of the respectively associated thyristors 1 to 4. In parallel with each thyristor 1 to 4, there is a series circuit consisting of a pair (13 to 16) of avalanche diodes of opposite polarity, and of an impedance unit 17 to 20 made up of low-ohmic resistance with a condenser connected in parallel, one terminal of this impedance unit being connected to the cathode and the other terminal being connected through a coupling diode 21—24 to the control electrode of the associated thyristor 1—4.

The device according to FIG. 1 functions in the following manner:

In order to initiate the current-conducting phase, firing pulses are simultaneously fed to the control electrodes of the thyristors via the control transformers 5—8 and the coupling diodes 9—12. If it is now assumed that one or more of the thyristors 1—4 have not fired because of some fault in firing-transmission, there is then a voltage across each of these unfired thyristors, and across the pairs 13—16 of avalanche diodes, respectively connected in parallel with them, which voltage exceeds the avalanche breakdown voltage of these diodes. The diode breakdown current thus initiated, causes a fast increasing voltage drop in the following impedance 17—20. This voltage drop, which due to peculiar impedance consisting of a resistor with a condenser connected in parallel, depends, predominantly on the charge displaced by the diode breakdown current, is passed through the corresponding coupling diode 21—24 and forms an additional firing pulse to the control electrode of the associated thyristor 1—4, and fires the latter.

In a modification of the embodiment according to FIG. 1, a zener diode may be connected between each of the coupling diodes 21—24 and the control electrode of each of the thyristors 1—4 in order to cause a voltage-threshold. Another type of impedance unit may also be used instead of the low ohmic resistance a condenser connected in parallel.

Figure 2:
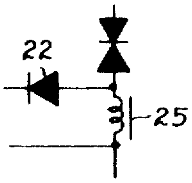
FIG. 2 is a subcircuit diagram showing use of a different type of impedance unit, this being in the form of a choke coil.

FIG. 2 shows the portion of the circuit corresponding to detail A in FIG. 1, and repeated for each thyristor, in another embodiment of the current-inverter arrangement, wherein a choke 25 is used for the impedance.

Figure 3:
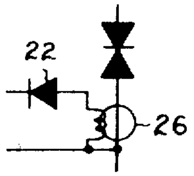
FIG. 3 is also a subcircuit diagram showing use of still another type of impedance unit, this being in the form of the primary winding of a transformer, the secondary of which is connected to a coupling diode.

In a further embodiment, whereof the circuit detail is illustrated in FIG. 3, the impedance is the primary winding of a transformer 26 whereof the secondary winding is connected to the coupling diode 22.

For certain uses in which extremely fast voltage changes across the circuit arrangement, are to be expected, it may happen in the arrangement so far described that the current flowing in the impedance units 17—20 by virtue of the cut-off-layer capacities of the avalanche diodes will set up a voltage drop which is sufficiently high to provide undesired firing of the thyristors. An embodiment according to FIG. 4, may then advantageously be used in such applications.

Figure 4:
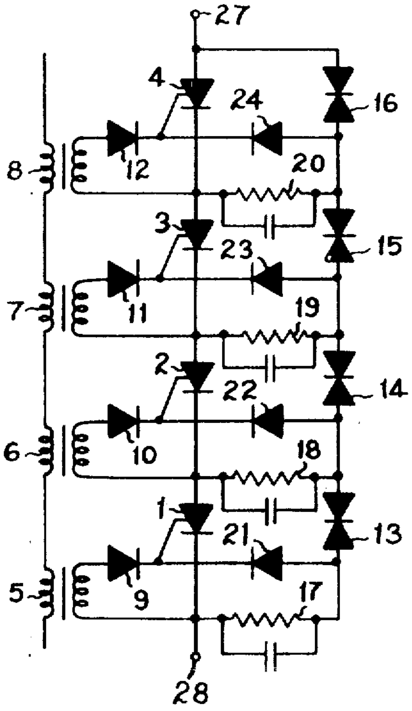
FIG. 4 is a full circuit diagram similar to FIG. 1 but utilizing a somewhat different circuit arrangement for the impedance units.

This FIG. 4 embodiment comprises a chain of series-connected pairs 13 to 16 of avalanche diodes, one end of which chain is connected to the anode-terminal 27 of the thyristor chain, and impedance units 17—20 (paralleled resistance and condenser) each of which is connected between the associated junctions of two thyristors 1—4 one the one hand and between the junctions of two pairs 13—16 of avalanche diodes on the other hand, and also between the other end of the chain of avalanche diodes and the cathode-terminal 28 of the thyristor chain.

If, for example, the thyristors 1 and 2 have not fired for some reason after this arrangement has fired, the initiating current will flow through the thyristors 4, 3, the impedance 19, the pairs of diodes 14,13 and the impedance 17. The voltage drop across the impedance 17 causes the thyristor 1 to fire, whereupon the impedance 18 is brought into the current-carrying circuit, which finally also causes the thyristor 2 to fire.

As opposed to the arrangement according to FIG. 1, subsequent firing of those thyristors which have not fired normally, occurs sequentially rather than simultaneously.

As a modification of the embodiments described, it is permissible for some applications to provide a primary firing device, e.g. a control transformer, for only some of the thyristors, and to initiate the firing of the remaining thyristors in each case solely by those voltage dropping as a result of the current set up in the associated impedance 17—20.

We claim:

1. In a current-converter system, the combination comprising a chain of solid state valves of the controllable type connected electrically in series in a current flow path, means connected between the cathode and control electrode of each said valve for providing a firing pulse thereto, and a protective circuit for said series-connected valves comprising for each said valve a pair of oppositely poled avalanche diodes and a coupling diode connected in series between the anode side of the valve and the control electrode thereof, said pairs of oppositely poled avalanche diodes being connected directly in series and to the current flow path at opposite ends of the chain, and an impedance component individual to each said valve and which is connected at one terminal to the junction between the oppositely poled avalanche diodes correlated to said valve and the oppositely poled avalanche diodes for the adjacent valve in the chain and which is connected at its other terminal to the cathode side of said valve, said impedance component correlated to the last valve in the chain being included in the series circuit connection of said pairs of oppositely poled avalanche diodes which extends to said current flow pat at the opposite end of said valve chain.